A. W. STONESTREET.
AUTOMATIC PNEUMATIC, PNEUMATIC TIRE INFLATING MECHANISM.
APPLICATION FILED OCT. 14, 1916.
1,338,337.
Patented Apr. 27, 1920.
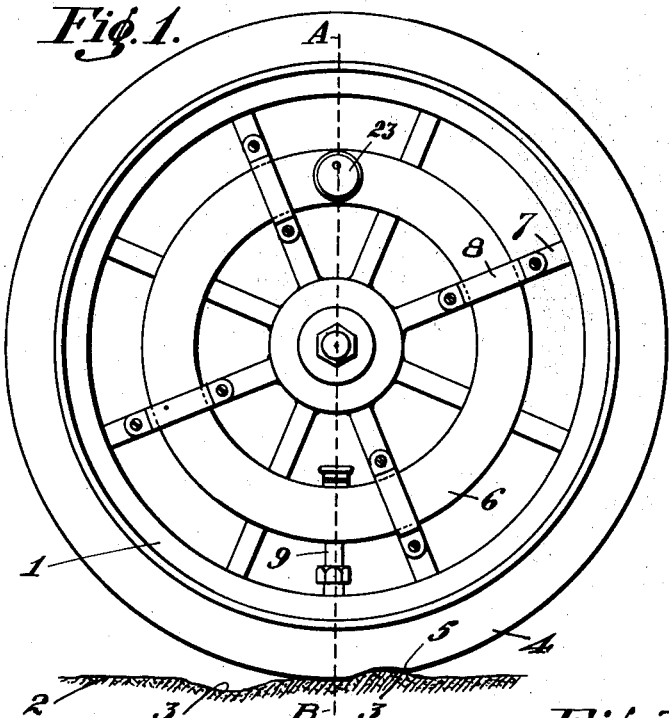
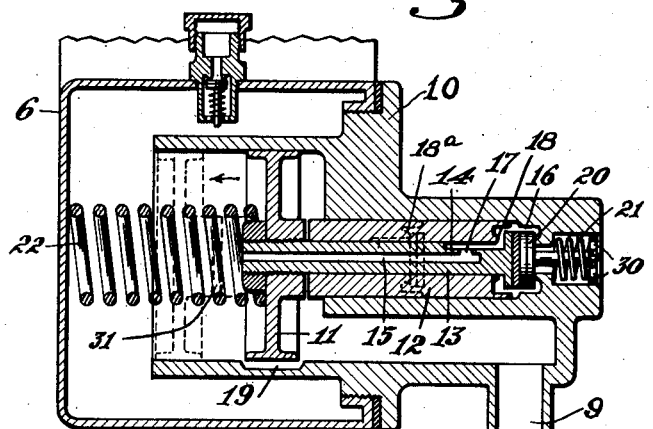
INVENTOR.
Arthur W. Stonestreet
BY 
ATTORNEY.

UNITED STATES PATENT OFFICE.

ARTHUR W. STONESTREET, OF PASADENA, CALIFORNIA.

AUTOMATIC PNEUMATIC, PNEUMATIC-TIRE-INFLATING MECHANISM.

1,338,337.  Specification of Letters Patent.  Patented Apr. 27, 1920.

Application filed October 14, 1916. Serial No. 125,599.

*To all whom it may concern:*

Be it known that I, ARTHUR W. STONESTREET, a citizen of the United States, residing at Pasadena, in the county of Los Angeles and the State of California, have invented a new and useful Automatic Pneumatic, Pneumatic-Tire-Inflating Mechanism, of which the following is a specification.

This invention relates to the automatic inflation of pneumatic tires and the object of my invention is to provide means for automatically inflating the tire while in motion.

I attain this object by the mechanism illustrated in the accompanying drawing, in which like characters of reference, indicate similar parts in the several views.

Referring to the drawing: Figure 1 is plan view of an automobile wheel with a tire mounted on it and showing method of attaching inflating mechanism.

Fig. 2 is a cross section along the line A—B of Fig. 1.

Fig. 3 is an enlarged cross section of the automatic inflating mechanism along the line A—B of Fig. 1.

Fig. 4 is an enlarged cross section of a pressure release valve along the line A—B of Fig. 1.

Referring to Fig. 1; as the wheel 1 is propelled along the road, 2, any depression or projection, 3, encountered, produces a shock and causes the tire, 4, to bend in, as indicated at 5, and causes a sudden increase of pressure inside the tire 4.

It is this rise in pressure, that I utilize, to inflate the tire still more. 6 is a back pressure reservoir attached to the spokes 7, by clamps, 8, and connected to the tire by passage way 9, shown in Fig. 2. Interposed between the air in the tire and the air in the back pressure reservoir is piston 11, shown enlarged in Fig. 3.

The functions of the back pressure reservoir 6, are to lessen the resistance to the forward stroke of piston 11, and to store up energy for the retrograde stroke. The inflating mechanism consists of a cylinder 10, adapted to screw into the back pressure reservoir 6.

Fitted into cylinder 10, are pistons 11 and 12. Screwed into piston 11 is valve 13, which is reduced in diameter at one end 14.

Extending into the stem of valve 13 is a passage way 15 connecting with intake chamber 16 through hole 17. Formed on the end of piston 12, is a valve seat 18, piston 12 having a medium tight fit in the small part of cylinder 10, and a sliding fit on the stem of valve 13.

A small passage way 19, formed in wall of the large part of cylinder 10, affords means of communication between tire 4, and back pressure reservoir 6, when piston 11 is in normal position.

Normally the air contained in tire 4, and back pressure reservoir 6, is of the same pressure; striking a depression, or a projection 3, in the road, 2, causes a sudden increase of pressure in tire 4, this excess pressure will be transmitted to back pressure reservoir 6, through passage way 9, and as piston 11 is interposed between tire 4, and back pressure reservoir 6, piston 11 will be pushed back in the direction of the arrow, and will carry with it valve 13, and piston 12 in a manner hereafter described.

As valve 13 moves in unison with piston 11, and as piston 12 is a medium tight fit in the small part of cylinder 10, and a sliding fit on the stem of valve 13, attention is called to the fact that valve 13, must be seated on valve seat 18, (like shown dotted at 18$^a$,) before piston 12 commences to move. The seating of valve 13, on valve seat 18, seals communication between intake chamber 16, and back pressure reservoir 6, and carries piston 12, together with valve 13 and piston 11 in the direction of arrow.

This movement of pistons 11, and 12, and valve 13 creates a vacuum in intake chamber 16, and air at atmospheric pressure passes through holes 30 and lifts valve 20 from its seat and fills intake chamber 16.

A small movement of piston 11 closes passage way 19 and seals communication between tire 4, and back pressure reservoir 6. As the excess pressure in tire 4, is of but momentary duration and quickly subsides to normal, it follows that as the air in back pressure reservoir 6, was raised in pressure by the movement of piston 11 that the excess pressure in back pressure reservoir 6, will immediately cause a retrograde movement of piston 11 and valve 13, and attention is here called to the fact that piston 12, will not move in unison with piston 11 and valve 13 until piston 11 comes into contact with the end of piston 12, shown dotted at 31. Any retrograde movement of piston 11 and valve 13 must therefore immediately lift valve 13 from its seat 18, and open communication between intake chamber 16 and back pressure reservoir 6, through hole 17 and passage way 15.

The air from back pressure reservoir 6, automatically mixes with and raises the air in intake chamber 16 to its own pressure, and will then be forced through hole 17 and passage way 15 into back pressure reservoir 6, by the continued retrograde movement of pistons 11 and 12 and valve 13, back to normal. A part of it will then pass into tire 4 through passage ways 19 and 9.

As soon as valve 13 is seated on valve seat 18 air will commence to be drawn into intake chamber 16, and as any retrograde movement of piston 11 and valve 13, will result in automatically mixing the air drawn into vacuum chamber 16, with that contained in the back pressure reservoir 6, it is evident that the full stroke, shown dotted, of piston 11, valve 13 and piston 12 does not have to be completed in order to secure the desired result. It is therefore evident that this is a variable stroke mechanism.

As soon as any retrograde movement of piston 11 and valve 13 and piston 12, takes place, valve 20 is closed by spring 21.

The function of spring 22 is to overcome friction in the retrograde movement of piston 11, valve 13 and piston 12 and insure a fixed normal position. Fig. 4 is a cross section of the pressure release valve along the line A—B of Fig. 1. 23 is a nut which screws down, and adjusts the pressure of spring 24 on valve 25 which is seated on its seat formed in the bottom of casing 26, which is screwed into back pressure reservoir 6.

Screwed to the bottom of casing 26, is casing 27 which forms a differential pressure chamber 28. Drilled into the bottom of casing 27, is a very small hole 29.

The object of the differential pressure chamber is to restrict the passage of air to valve 25, by means of the small hole 29, and thus prevent any sudden rise in pressure to reach valve 25 and cause it to open too far and release the air faster than required.

I claim—

1. In an automatic pneumatic tire inflating mechanism, a back pressure reservoir, a piston, a valve having communication through its stem with an intake chamber and rigidly connected with said piston, a smaller piston having a valve seat formed in one end, and slidably mounted on the stem of said valve and adapted to draw in air and automatically mix it with that in the back pressure reservoir, all substantially as set forth.

2. In an automatic pneumatic tire inflating mechanism, a back pressure reservoir, a cylinder having a communicating passage way formed in one of its walls, and a piston adapted to automatically close and open said passage way all substantially as set forth.

3. An automatic tire inflating mechanism comprising a back pressure reservoir, a piston cylinder in said reservoir having a passage way on its inner wall, a piston within said cylinder arranged to open and close communication to its opposite sides through said passage way, said cylinder communicating on one side of the piston with the interior of a pneumatic tire, a tubular stem on said piston, a tubular valve stem reciprocally mounted in said piston stem opening to the pressure chamber, a valve on said stem adapted to seat on the piston stem to close communication to the interior of the valve stem, an intake chamber in which said valve is disposed and a normally closed valve for admitting air to the intake chamber.

4. An automatic pneumatic tire inflating mechanism comprising a back pressure reservoir and an inflating mechanism, said inflating mechanism being actuated in one direction by increases of pressure in the tire.

5. An automatic pneumatic tire inflating mechanism comprising a back pressure reservoir and inflating mechanism, said inflating mechanism being actuated in one direction by increases of pressure in the tire, and in the opposite direction by increases of pressure in the said back pressure reservoir.

6. A tire inflating device, comprising a hollow member one portion of which is connected to the tire, another portion thereof being provided with a pump cylinder and an intake valve, a piston in said cylinder, a pressure operated plunger head connected to said piston and forming with said hollow member a back pressure air chamber, a valved communication through said piston and plunger head, said plunger head being movable in one direction by increases of pressure in the tire.

7. A tire inflating device, comprising a hollow member one portion of which is connected to the tire, another portion thereof being provided with a pump cylinder and an intake valve, a piston in said cylinder, a pressure operated plunger head connected to said piston and forming with said hollow member a back pressure air chamber, a valved communication through said piston and plunger head, said plunger head being movable in one direction by increases of pressure in the tire and means for effecting return movement of the plunger head.

ARTHUR W. STONESTREET.

Witnesses:
HETTIE DILLON,
MINNIE B. WHEATON.